US007043419B2

(12) United States Patent
Chess et al.

(10) Patent No.: US 7,043,419 B2
(45) Date of Patent: May 9, 2006

(54) METHOD AND APPARATUS FOR PUBLISHING AND MONITORING ENTITIES PROVIDING SERVICES IN A DISTRIBUTED DATA PROCESSING SYSTEM

(75) Inventors: David M. Chess, Mohegan Lake, NY (US); Edward Charles Snible, New York, NY (US); Ian Nicholas Whalley, Pawling, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 10/252,816

(22) Filed: Sep. 20, 2002

(65) Prior Publication Data

US 2004/0059810 A1 Mar. 25, 2004

(51) Int. Cl.
*G06F 15/173* (2006.01)

(52) U.S. Cl. .................. 703/224; 703/223; 703/205; 715/513

(58) Field of Classification Search ......... 709/223–224, 709/201–205; 715/513

See application file for complete search history.

(56) References Cited

U.S. PATENT DOCUMENTS

| 5,805,776 A | 9/1998 | Juengst et al. ............... 395/75 |
| 5,935,264 A | 8/1999 | Nevill et al. |
| 5,978,911 A | 11/1999 | Knox et al. ..................... 713/1 |

(Continued)

FOREIGN PATENT DOCUMENTS

WO    WO 02/093290    11/2002

OTHER PUBLICATIONS http://www.ibm.com/research/autonomic, "Autonomic Computing: IBM's Perspective on the State of Information Technology", Oct. 2001, pp. 1–40.

IBM Technical Disclosure Bulletin, Mar. 2002, UK, "Distributed UDDI (Universal Description Discovery and Integration) Registry Lookup and Storage", Issue No. 455, p. No. 499.

Feng et al., "Updating Semantic Information to Support Coordination in Distributed Software Development Environments", p. 13–22, 1993 IEEE, retrieved from IEEE database Mar. 4, 2004.

Gavrilovska et al., "A Practical Approach for 'Zero' Downtime in an Operational Information System", Jul. 2002, retrieved from IEEE database Mar. 4, 2004.

Panagos et al., "Synchronization and Recovery in a Client–Server Storage System", p. 209–223, 1997 The VLDB Journal, retrieved from ACM Portal database Mar. 4, 2004.

(Continued)

*Primary Examiner*—Jason D. Cardone
*Assistant Examiner*—Hieu Le
(74) *Attorney, Agent, or Firm*—Duke W. Yee; Eustus Dwayne Nelson; Wayne P. Bailey

(57) ABSTRACT

A method, apparatus, and computer instructions for providing identification and monitoring of entities. A distributed data processing system includes one or more distributed publishing entities, which publish computer readable announcements in a standard language. These announcements may contain a description of a monitoring method that may be used to monitor the behavior of one or more distributed monitored entities. These announcements also may include information used to identify a monitoring method that may be used by the distributed monitored entity to monitor its own behavior or by a distributed consumer entity to monitor the behavior of the distributed monitored entity. The monitoring also may be performed by a third-party distributed monitoring entity.

27 Claims, 6 Drawing Sheets

U.S. PATENT DOCUMENTS

| | | | |
|---|---|---|---|
| 6,023,586 A | 2/2000 | Gaisford et al. | 395/712 |
| 6,026,374 A | 2/2000 | Chess | 705/26 |
| 6,125,359 A | 9/2000 | Lautzenheiser et al. | |
| 6,182,245 B1 | 1/2001 | Akin et al. | |
| 6,199,204 B1 | 3/2001 | Donohue | 717/11 |
| 6,219,829 B1 | 4/2001 | Sivakumar et al. | |
| 6,286,131 B1 | 9/2001 | Beers et al. | |
| 6,353,897 B1 | 3/2002 | Nock et al. | |
| 6,463,584 B1 | 10/2002 | Gard et al. | 717/171 |
| 6,567,957 B1 | 5/2003 | Chang et al. | 716/4 |
| 6,584,455 B1 | 6/2003 | Hekmatpour | 706/45 |
| 6,804,709 B1 | 10/2004 | Manjure et al. | |
| 2002/0100036 A1 | 7/2002 | Moshir et al. | 717/173 |
| 2002/0143819 A1 * | 10/2002 | Han et al. | 707/513 |
| 2002/0174414 A1 | 11/2002 | Matsuo et al. | |
| 2003/0212924 A1 | 11/2003 | Avvari et al. | |
| 2003/0235158 A1 | 12/2003 | Lee et al. | 370/256 |

OTHER PUBLICATIONS

Yajnik et al., "STL: A Tool for On–Line Software Update and Rejuvenation", p. 258, 1997 IEEE, retrieved from IEEE database Mar. 4, 2004.

Bagchi et al., "Dependency Analysis in Distributed Systems using Fault Injection: Application to Problem Determination In an e–commerce Environment", Distributed Operations and Management, 2001, 11 pages.

Brown et al., "An Active Approach to Characterizing Dynamic Dependencies for Problem Determination in a Distributed Environment", Seventh IFIP/IEEE International Symposium on Integrated Network Management, 2001, 14 pages.

Butler et al., "Error Burst Metrics for Failure Trajectory Analysis", International Transmission System, IEE Colloquium, The Institution of Electrical Engineers, 1994, IEE, Savoy Place, London WC2R 0BL, UK, 4 pages.

Goswami et al., "Prediction–Based Dynamic Load–Sharing Heuristics", IEEE Transactions on Parallel and Distributed Systems, vol. 4, No. 6, Jun. 1993, pp. 638–648.

Hellerstein, "An Approach to Selecting Metrics for Detecting Performance Problems in Information Systems", Proceedings of the Second International Conference on Systems Management, Jun. 19–21, 1996, Toronto, Canada, pp. 1–11.

Hellerstein et al., "Mining Event Data for Actionable Patterns", IBM Thomas J. Watson Research Center, Hawthorne, New York, The Computer Management Group, 2000, 12 pages.

Keller et al., "Classification and Computation of Dependencies for Distributed Management", Proceedings of the Fifth IEEE Symposium on Computers and Communication, 2000, pp. 78–83.

Muggleton et al., "Efficient Induction of Logic Programs", The Turing Institute, Glasgo, UK, pp. 1–14.

Quinlan et al., "Induction of Logic Programs: FOIL and Related Systems", New Generation Computing 13, 1995, pp. 287–312, 28 pages.

Lee et al., "Error/Fallure Analysis Using Event Logs from Fault Tolerant Systems", Fault–Tolerant Computing, 1991, FTCS–21. Digest of Papers, Twenty–First International Symposium, 1991, pp. 10–17.

Ma et al., "Event Browser: A Flexible Tool for Scalable Analysis of Event Data", Distributed Operations and Management, 1999, pp. 1–12.

Ma et al., "Mining Mutually Dependent Patterns", IEEE Conference on Data Mining, 2001, pp. 1–20.

Tang et al., "Analysis and Modeling of Correlated Failures in Multicomputer Systems", IEEE Transactions on Computers, vol. 41, No. 5, May 1992, pp. 567–577.

Thottan et al., "Proactive Anomaly Detection Using Distributed Intelligent Agents", IEEE Network, Sep./Oct. 1998, pp. 21–27.

Vilalta et al., "Predictive Algorithms In the Management of Computer Systems", IBM Systems Journal, vol. 41, No. 3, 2002, pp. 461–474.

Rouvellou et al., "Combining Different Business Rules Technologies: A Rationalization", Proc. Of the OOPSLA 2000 Workshop on Best–Practices in Business Rule Design and Implementation, Minneapolis, MN, Oct. 2000, pp. 1–6.

Grosof, IBM Research Report RC20836, "Courteous Logic Programs: Prioritized Conflict Handling for Rules", May 97, 63pp.

Van Den Heuvel W–J et al: "Service Representation, Discovery, and Composition for E–marketplaces", Cooperative Information Systems. $9^{th}$ International Conference Coopis 2001. Proceedings (Lecture Notes in Computer Science vol. 2172), Proceedings, Trento, Italy, Sep. 5–7, 2000, pp. 270–284.

Piccinelli et al., "Dynamic Service Aggregation in Electronic Marketplaces", Computer Networks 37 (2001), Elsevier Science Publishers B.V., Amsterdam, NL, vol. 37, No. 2, Oct. 2001, pp. 95–109.

Guttman, "Service Location Protocol: Automatic Discovery of IP Network Services", IEEE Internet Computing, IEEE Service Center, Piscataway, NJ, US, vol. 3, No. 4, Jul. 1, 1999, pp. 71–80.

\* cited by examiner

```
                                                               800
                                                              ↙
   <xsd:element name="TranslateShortStringRequest">
   <xsd:complexType>
    <xsd:all>
     <xsd:element name="ShortString" type="string"/>
     <xsd:element name="FromLanguage" type="LanguageIdentifier"/>
     <xsd:element name="ToLanguage" type="LanguageIdentifier"/>
    </xsd:all>
   </xsd:complexType>
   </xsd:element>

<xsd:element name="TranslateShortStringTestIn">
   <xsd:complexType>
    <xsd:all>
     <xsd:element name="ShortString" type="string" testmeth:value="cinque" />
     <xsd:element name="FromLanguage" type="LanguageIdentifier" testmeth:value="fr" />
     <xsd:element name="ToLanguage" type="LanguageIdentifier" testmeth:value="en" />
    </xsd:all>
   </xsd:complexType>
802⎨</xsd:element>

<xsd:element name="TranslateShortStringTestOut">
   <xsd:complexType>
    <xsd:all>
     <xsd:element name="ShortString" type="string" testmeth:value="five" />
    </xsd:all>
   </xsd:complexType>
   </xsd:element>

<wsdl:portType name="TranslationServicePortType">
    <wsdl:operation name="TranslateShortString">
     <wsdl:input message="TranslateShortStringRequest"/>
     <wsdl:output message="TranslateShortStringResponse"/>
     <wsdl:fault message="TranslateServiceFault"/>
  804⎨<testmeth:testInput message="TranslateShortStringTestIn" />
      <testmeth:testOutput message="TranslateShortStringTestOut" />
    </wsdl:operation>
   </wsdl:portType>
```

*FIG. 8*

METHOD AND APPARATUS FOR PUBLISHING AND MONITORING ENTITIES PROVIDING SERVICES IN A DISTRIBUTED DATA PROCESSING SYSTEM

CROSS REFERENCE TO RELATED APPLICATIONS

The present invention is related to the following applications entitled: "Method and Apparatus for Automatic Updating and Testing of Software", Ser. No. 10/252,868, "Composition Service for Autonomic Computing", Ser. No. 10/252,324, "Self-Managing Computing System", Ser. No. 10/252,247, and "Adaptive Problem Determination and Recovery in a Computer System", Ser. No. 10/252,979, all filed even date hereof, assigned to the same assignee, and incorporated herein by reference.

BACKGROUND OF THE INVENTION

1. Technical Field

The present invention relates generally to an improved distributed data processing system, and in particular, to a method and apparatus for monitoring entities in a distributed data processing system. Still more particularly, the present invention provides a method and apparatus for identifying and monitoring entities providing services in a network data processing system.

2. Description of Related Art

Modern computing technology has resulted in immensely complicated and ever-changing environments. One such environment is the Internet, which is also referred to as an "internetwork". The Internet is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols. Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language. The Internet also is widely used to transfer applications to users using browsers. Often times, users of software packages may search for and obtain updates to those software packages through the Internet.

Other types of complex network data processing systems include those created for facilitating work in large corporations. In many cases, these networks may span across regions in various worldwide locations. These complex networks also may use the Internet as part of a virtual private network for conducting business. These networks are further complicated by the need to manage and update software used within the network. Often times, interaction between different network data processing systems occurs to facilitate different transactions. These transactions may include, for example, purchasing and delivery of supplies, parts, and services. The transactions may occur within a single business or between different businesses.

Such environments are made up of many loosely-connected software components. These software components are also referred to as "entities". In a modern complex network data processing system, innumerable situations exist in which a need arises to test or monitor the operation of another entity, such as, a particular running process or a particular service. Currently, a human operator must test and monitor the proper functioning of entities, such as important system services, to detect and correct faults and failures in these entities. In many cases, a service may depend on other services for its correct functioning. In this case, it is important to determine whether those other services are functioning correctly, in order to take steps or produce alerts when the services are not functioning correctly. For example, a purchasing entity used for ordering supplies may infrequently require a selected component from a particular provider. Although this component is needed infrequently, it is essential to be able to obtain the component quickly when the need arises. If the provider changes its inventory and no longer offers the component or if the order entity used at the provider to generate the order is unavailable, it is crucial for the purchasing entity to be able to locate another service. Currently, a human operator is required to identify a process to test the order entity to determine whether the order entity is functioning correctly. In this example, the order entity is functioning correctly if the order entity offers the selected component as being available in inventory. After identifying this process, the human operator must monitor the order entity.

Currently, the testing and monitoring of computing entities is performed primarily on an ad hoc basis. A human operator needing to monitor a particular service will write a monitoring program for that service or manually search for such a program that someone else has written to perform monitoring. The monitoring program will be deployed and configured manually, and the human operator will manually inspect its output. In some cases the human operator may wrap the monitoring program in a shell that will automatically take some action, such as restarting the service, when a problem is detected.

Existing maintenance and administration tools such as the IBM Tivoli Enterprise Console include features such as administration consoles that display the monitoring status and test results from a number of different entities, including detected faults and generated alerts, and allow administrators to specify actions that should be taken automatically when certain alerts occur. IBM Tivoli Enterprise Console is available from International Business Machines Corporation. Standards, such as the Simple Network Management Protocol (SNMP), specify well-documented ways of communicating alerts and other system events between entities. Some modern computing systems, both in hardware and in software, are designed with testability in mind, and in some cases either the original manufacturer or one or more third parties provide specific testing tools or algorithms for testing specific products.

Even with these types of maintenance and administration tools, a human operator is required to identify entities and methods that are to be used to monitor those entities. Such a system is time consuming and often may require extensive research to identify how a service is to be monitored. Therefore, it would be advantageous to have an improved method, apparatus, and computer instructions for identifying and monitoring entities providing services.

SUMMARY OF THE INVENTION

The present invention provides a method, apparatus, and computer instructions for providing identification and monitoring of entities. A distributed data processing system includes one or more distributed publishing entities, which publish computer readable announcements in a standard language. These announcements may contain a description of a monitoring method that may be used to monitor the behavior of one or more distributed monitored entities. These announcements also may include information used to identify a monitoring method that may be used by the distributed monitored entity to monitor its own behavior or by a distributed consumer entity to monitor the behavior of the distributed monitored entity. The monitoring also may be performed by a third-party distributed monitoring entity.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 is a diagram illustrating a data structure used in publishing monitoring methods for an entity in accordance with a preferred embodiment of the present invention.

DETAILED DESCRIPTION OF THE PREFERRED EMBODIMENT

Figure 1:
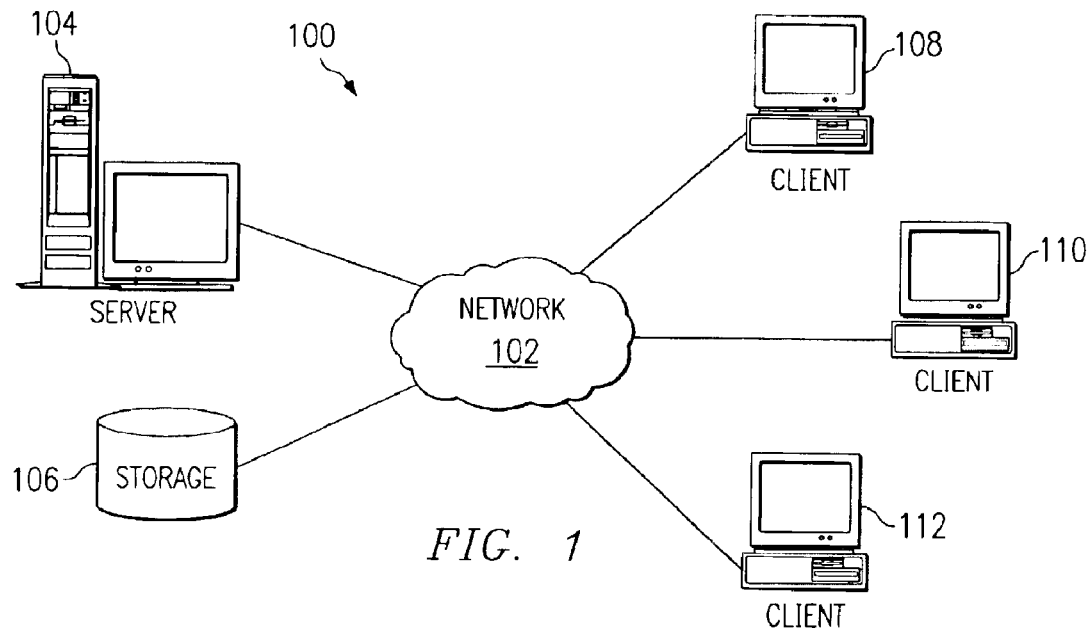
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. Server 104 and clients 108–112 may contain different distributed entities, which may communicate with each other through network 102. A "distributed entity" is any entity in a network data processing system that is able to perform functions, including without restriction, autonomic elements, agents, brokers, aggregators, monitors, consumers, suppliers, resellers, and mediators.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention. The mechanism of the present invention may be implemented in any network data processing system containing different data processing systems, which communicate with each other.

Figure 2:
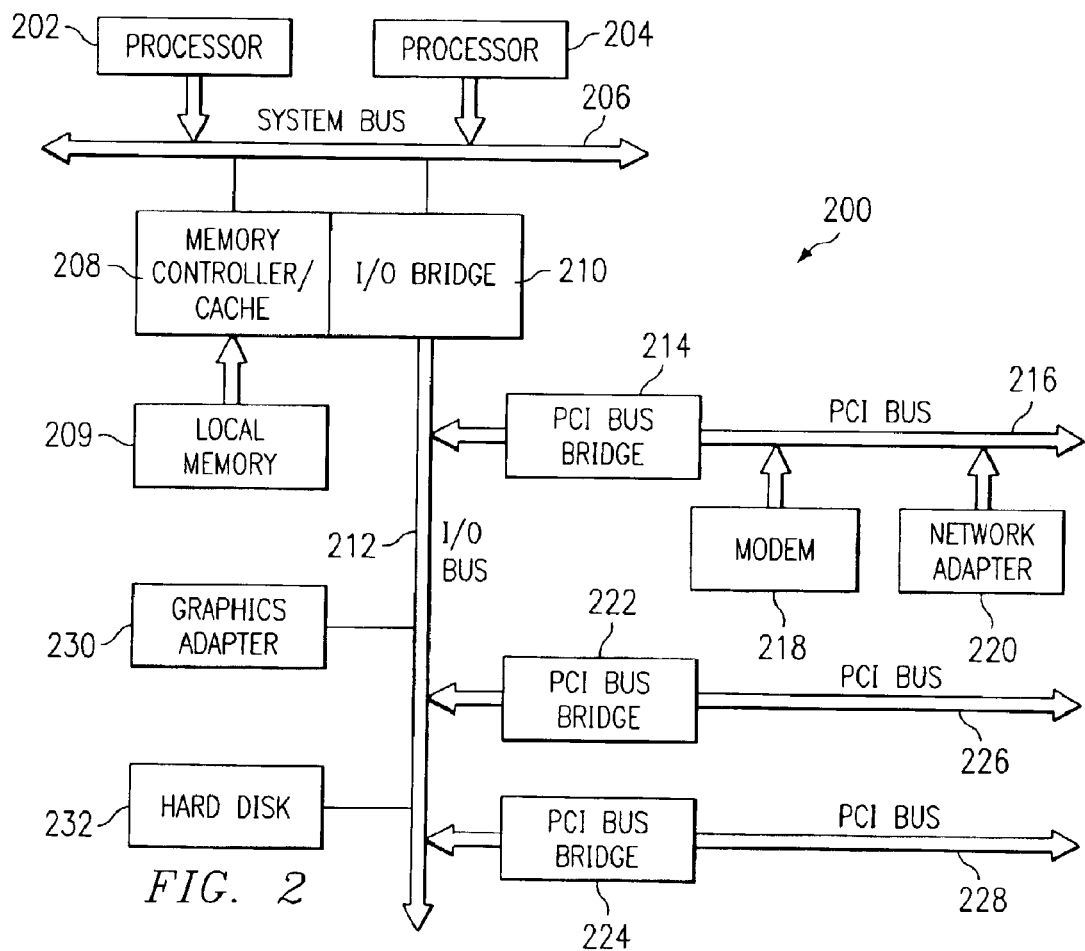
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a single or a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
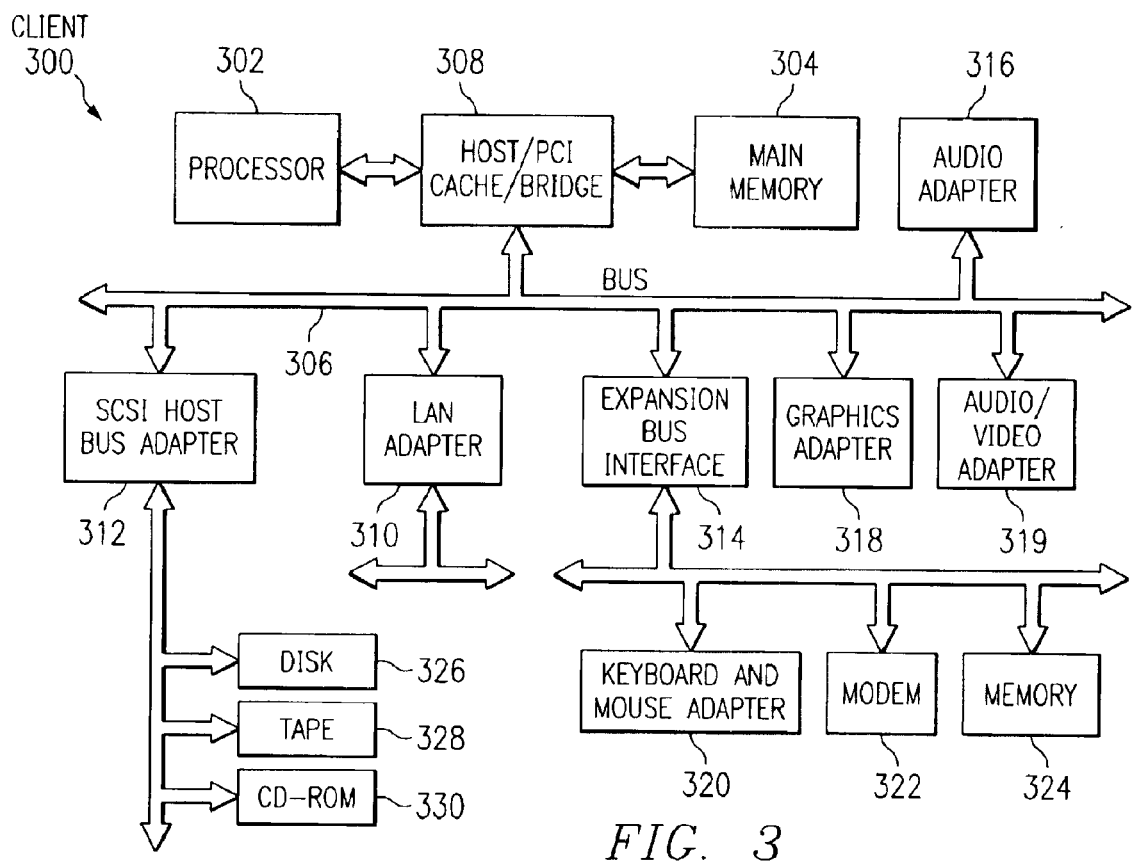
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer, such as client 108 in FIG. 1.

Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area-network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. Instructions for the operating system and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides an improved method, apparatus, and computer instructions for identifying and monitoring services provided by entities in a network data processing system. In particular, the mechanism of the present invention takes advantage of standards, such as Web Services Description Language (WSDL) and systems such as Universal Description, Discovery, and Integration (UDDI), which allow a program to locate entities that offer particular services and to automatically determine how to communicate and conduct transactions with those services.

WSDL is a proposed standard being considered by the WorldWide Web Consortium, authored by representatives of companies, such as International Business Machines Corporation, Ariba, Inc., and Microsoft Corporation. UDDI version 3 is the current specification being used for Web service applications and services. Future development and changes to UDDI will be handled by the Organization for the Advancement of Structured Information Standards (OASIS). The mechanism of the present invention uses these standards to publish additional information not normally provided. This information includes an identification of a method or process that may be used to monitor an entity. The monitoring may include, for example, testing the entity to determine whether the service is functioning. The monitoring may be performed by the client that uses the entity providing the service or by the entity itself to test its own functionality and availability. This information also may be used by a third-party monitoring entity to monitor the entity for the client.

Figure 4:
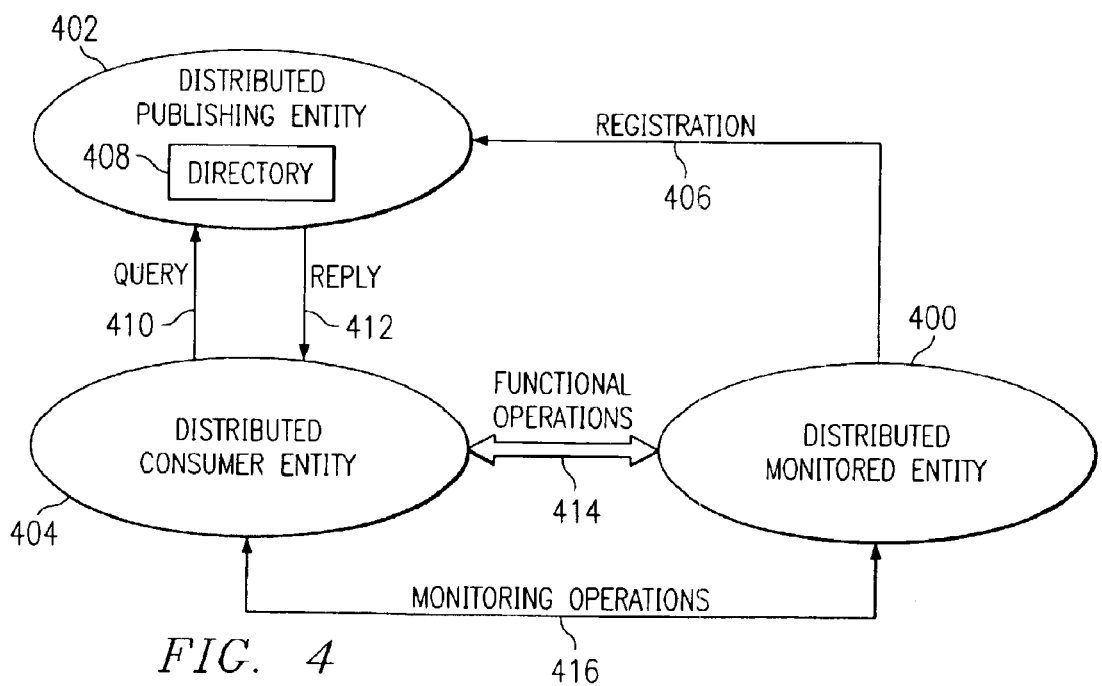
FIG. 4 is a diagram illustrating message flows used in monitoring entities in accordance with a preferred embodiment of the present invention.

Turning now to FIG. 4, a diagram illustrating message flows used in monitoring entities is depicted in accordance with a preferred embodiment of the present invention. The message flow in FIG. 4 flows between distributed monitored entity 400, distributed publishing entity 402, and distributed consumer entity 404. A distributed monitored entity is a distributed entity for which there exists at least one method or algorithm that can be used to establish, with some probability, that at least some portion of the entity is working correctly or is able to carry out at least one function. A distributed publishing entity is a distributed entity that publishes or otherwise makes available certain information in such a way that it can be accessed by at least one distributed entity. A distributed consumer entity is a distributed entity, which depends upon at least one other distributed entity in order to properly, or optimally, perform its functions. In these examples, the entities are software components or processes executing on a data processing system, such as data processing system 200 in FIG. 2 or data processing system 300 in FIG. 3. Depending on the particular implementation, these entities may all be located on different data processing systems or some or all of the entities may be located on the same data processing system.

In this example, distributed monitored entity 400 sends registration message 406 to distributed publishing entity 402, which functions as a directory service. Information about registered entities may be stored in directory 408. Directory 408 allows distributed publishing entity 402 to provide information about distributed monitored entity 400 as well as other entities registered with distributed publishing entity 402. In particular, directory 408 provides a mechanism to allow searching for registered entities matching selected criteria. In these examples, the selected criteria are a selected service. Other criteria may include, for example, a geographic location of the computer on which a distributed monitored entity is located or a particular protocol used to communicate with a distributed monitored entity. Registration message 406 includes both information about the services provided by distributed monitored entity 400 and information about how distributed monitored entity 400 may be automatically monitored for proper operation. This registration information may include a description of a monitoring method used to monitor distributed monitored entity 400. For example, distributed monitored entity 400 may include a monitoring interface specifically designed to enable monitoring of the entity. For example, the monitoring method may describe the particular commands and parameters to initiate a test to monitor distributed monitored entity 400. The interface may simply accept a request and provide a response indicating that it is able to respond to requests. The interface may be more complex and generate a data stream continuously or on some periodic basis based on some request sent to its monitoring interface. Distributed monitored entity 400 may be verified as functioning correctly if the data stream is received or if specific data is returned in the data stream. The response may be data generated from the particular service or set of services requested by the client, distributed consumer entity 404. Alternatively, the request sent may be an invalid request in which an expected error message is to be received. In another type of monitoring method, a particular universal resource endpoint on distributed monitored entity 400 may be provided to which a Simple Object Access Protocol (SOAP) request may be sent. In response to this request, a particular reply may be specified as one that is to be expected if distributed monitored entity 400 is functioning correctly. Another monitoring method may involve sending a particular pattern of data to a specified port in distributed monitored entity 400. A response to this data pattern should have some selected corresponding pattern if distributed monitored entity 400 is functioning correctly. In another monitoring method, a particular request or class of requests may be sent to distributed monitored entity 400 with a reply being received within a selected period of time if distributed monitored entity 400 is functioning correctly. This specific period of time may be specified in the request that is sent. In other cases, the monitoring method may be a particular program or program fragment that is to be used to test distributed monitored entity 400. This type of program may take various forms, such as, for example, a Practical Extraction Report Language (PERL) script, a Remote Method Invocation (RMI) client, a RMI stub class, and a binary executable. Of course, other types of monitoring methods may be implemented depending on the particular implementation.

Further, information about how distributed monitored entity 400 may be automatically monitored for proper operation may be sent to distributed publishing entity 402 for entry into directory 408 by an entity other than distributed monitored entity 400. For example, this registration information may be sent through a testing expert agent or even a human operator inputting data. In some cases, the information about how distributed monitored entity 400 may be monitored is retained at distributed monitored entity 400 and not entered into directory 408. In this case, the client, such as distributed consumer entity 404, would obtain the method for monitoring distributed monitored entity 400 directly from distributed monitored entity 400. Directory 408 includes identifications of entities, and services provided by entities, as well as monitoring methods for monitoring an entity. This directory also may include other information, such as, for example, distributed monitored entities currently being monitored, previously monitored, or expected to be monitored in the future.

Later, when distributed consumer entity 404 needs to locate an entity to provide a particular service, this entity sends query message 410 to distributed publishing entity 402. Alternatively, this query may be a broadcast message that is received by a number of distributed publishing entities with one or more of these entities providing a reply. Distributed publishing entity 402 locates the appropriate service in directory 408 and returns information about entities providing the particular service in reply message 412 to distributed consumer entity 404. This reply may contain information about a number of different entities, which provide the particular service. If more than one entity is included in reply message 412, distributed consumer entity 404 may select one or more of these entities with which to operate or communicate. In this example, distributed consumer entity 404 selects distributed monitored entity 400. The information in reply message 412 includes information on how to contact distributed monitored entity 400 as well as how this entity may be monitored for proper operation. This information may include at least one description of a monitoring method that may be applied to distributed monitored entity 400. The monitoring method may be a process that is initiated on the distributed monitored entity on distributed monitored entity 400. The process in the monitoring method may be located within distributed monitored entity 400 or at another location, such as at distributed consumer entity 404. Depending on the particular implementation, the monitoring information may be excluded from reply message 412 with this monitoring information being obtained directly from distributed monitored entity 400 by distributed consumer entity 404.

The entities identified and the monitoring methods provided may be based on particular service level agreements or other agreements between the different entities. For example, the monitoring method used to monitor distributed monitored entity 400 may be provided by distributed publishing entity 402 to distributed consumer entity 404 based on some service level agreement or other agreement established between distributed monitored entity 400 and distributed publishing entity 402.

Distributed consumer entity 404 contacts distributed monitored entity 400 after receiving reply message 412 to initiate functional operations 414 using methods and protocols. These are methods and protocols known in the art, such as, for example, WSDL and UDDI. This contact is initiated to allow distributed consumer entity 404 to use a service or services offered by distributed monitored entity 400. Distributed consumer entity 404 also performs monitoring operations 416 with distributed monitored entity 400 to verify that distributed monitored entity 400 continues to operate properly. These monitoring operations are described in reply message 412 in these examples. The monitoring operations may be initiated through different events, such as a periodic event or a non-periodic event. The periodic event may be an expiration of a timer that triggers the monitoring operation. The non-periodic event may be, for example, initiation of a selected operation, such as a purchase order by distributed consumer entity 404. In these examples, monitoring operations 416 is a method, such as one or more tests that may be performed on distributed monitored entity 400. If one or more tests fail during monitoring, distributed consumer entity 404 may take corrective actions. These corrective actions may include, for example, performing further diagnostic tests to determine a cause of the failure, notifying a human administrator of the test failure, notifying another distributed entity that a problem exists, contacting distributed publishing entity 402 to identify a replacement for distributed monitored entity 400, attempting to restart distributed monitored entity 400, or executing a selected sequence of actions specified within the testing method identified in reply message 412.

In another embodiment of the present invention, distributed consumer entity 404 carries out the testing operations described in reply message 412 to verify the proper operation of distributed monitored entity 400 before distributed consumer entity 404 begins functional operations 414 with distributed monitored entity 400. In another embodiment of this invention, distributed consumer entity 404 carries out the testing operations described in reply message 412 only after a service level agreement or other agreement is in place between distributed monitored entity 400 and distributed consumer entity 404, and the testing operations are responsive to that agreement. In one possible embodiment, the testing operations are used to verify that the service provided by distributed monitored entity 400 is within the response-time range specified in the relevant agreement.

In the preferred embodiment of the present invention, distributed monitored entity 400 implements at least one monitoring interface specifically designed to enable monitoring operations 416, initiated by distributed consumer entity 404 to monitor distributed monitored entity 400. In other embodiments of the present invention, monitoring operations 416 initiated by distributed consumer entity 404 to monitor distributed monitored entity 400 includes sending an invalid request to distributed monitored entity 400 and verifying that the expected error indication is received. In still other embodiments, monitoring operations 416 may include requesting that distributed monitored entity 400 generate a continuous or periodic stream of messages directed to distributed publishing entity 402 and verifying that the stream of messages continues to arrive as expected.

In another embodiment of the present invention, distributed monitored entity 400 queries directory 408 in distributed publishing entity 402 to obtain information about how distributed monitored entity 400 may be monitored for proper operation. This information is used by distributed monitored entity 400 to monitor its own operation, for self-diagnostic purposes. In yet another embodiment of this invention, distributed consumer entity 404 receives the information about how distributed monitored entity 400 may be monitored for proper operation from distributed monitored entity 400 itself, rather than from distributed publishing entity 402.

Figure 5:
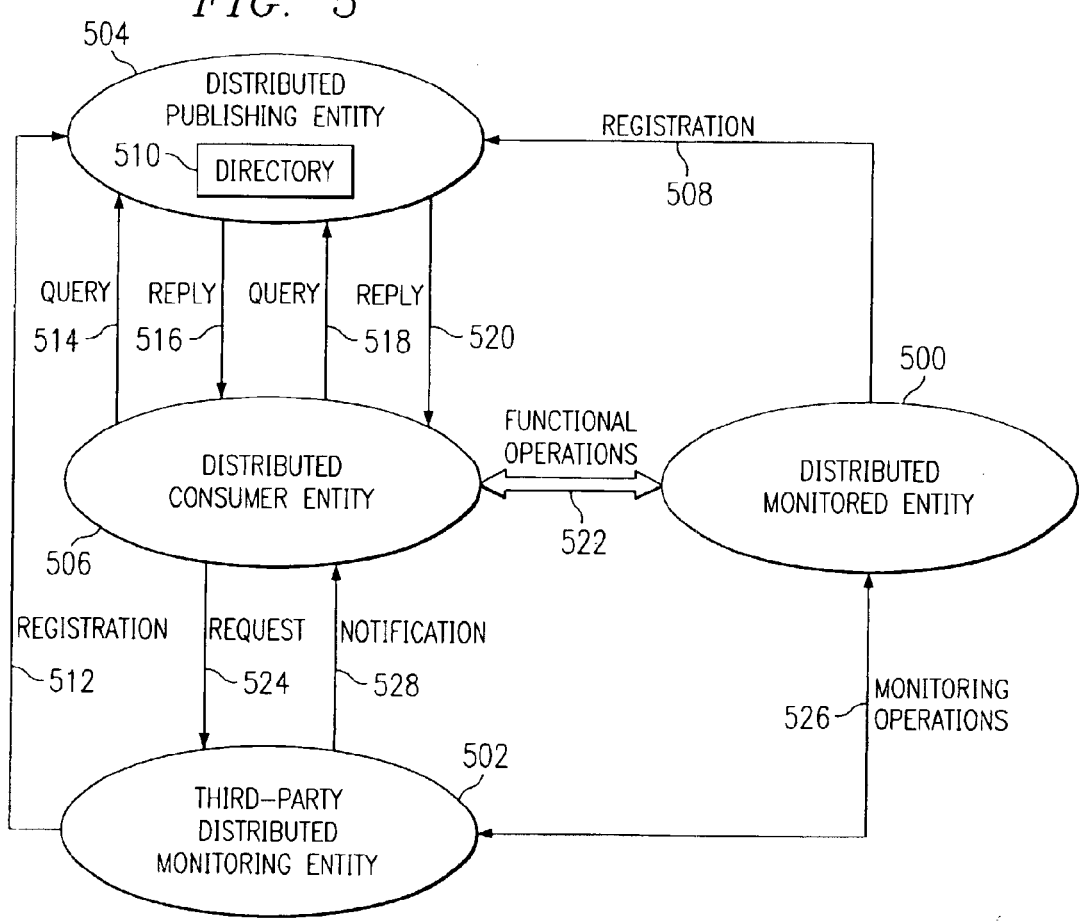
FIG. 5 is a diagram illustrating message flow used to monitor entities in which a third-party distributed monitoring entity is present in accordance with a preferred embodiment of the present invention.

With reference now to FIG. 5, a diagram illustrating message flow used to monitor entities in which a third-party distributed monitoring entity is present is depicted in accordance with a preferred embodiment of the present invention. In this example, the monitoring of an entity involves distributed monitored entity 500, which is the distributed monitored entity, third-party distributed monitoring entity 502, distributed publishing entity 504, and distributed consumer entity 506. In some cases, distributed consumer entity 506 may rely on services provided by another entity, such as distributed monitored entity 500 for correct or optimal functioning. In some instances, distributed consumer entity 506 may be unable to perform monitoring functions. Third-party monitoring also may be used for efficiency reasons. As a result, another entity, such as third-party distributed monitoring entity 502, may be employed to provide the monitoring function.

A distributed monitoring entity is a distributed entity, which makes use of at least one technique or algorithm to establish, with some probability, that at least some portion of a distributed monitored entity is working correctly, or is able to carry out at least one function. A third-party distributed monitoring entity is a distributed monitoring entity, which potentially monitors at least one distributed monitored entity upon which the entity does not itself depend for proper, or optimal, performance of its own functions. Additionally, third-party distributed monitoring entity 502 also may accept requests from other entities other than distributed consumer entity 506 to monitor distributed monitored entity 500 or other entities. In other words, third-party distributed monitoring entity 502 may provide monitoring for multiple clients and multiple distributed monitored entities.

Additionally, a fee may be charged for monitoring services provided by third-party distributed monitoring entity 502. Additionally, the type of monitoring, monitoring method, or parameters used in monitoring, may be changed or modified based on input received from another entity, such as, for example, distributed publishing entity 504. A modification may include, for example, changing entities that are to be notified as to the results of monitoring of distributed monitored entity 500. In this example, third-party distributed monitoring entity 502 sends registration message 508 to distributed publishing entity 504, which functions as a directory service. Information about distributed monitored entity 500 as well as information about third-party distributed monitoring entity 502 may be stored in directory 510 within distributed publishing entity 504. In this example, registration message 508 contains information about the monitoring method or methods that may be performed on distributed monitored entity 500. In this example, third-party distributed monitoring entity 502 sends registration message 512 to register itself with distributed publishing entity 504 as an entity capable of performing monitoring operations on entities, such as distributed monitored entity 500. Registration message 512 identifies the type of monitoring that may be performed by third-party distributed monitoring entity 502. This information also may identify entities with which monitoring may be performed.

Depending on the particular implementation, third-party distributed monitoring entity 502 also may include information in registration message 512 to register monitoring information about distributed monitored entity 500 with distributed publishing entity 504. Additionally, directory 510 also may contain information about third-party distributed monitoring entities currently providing monitoring services, third-party distributed monitoring entities, which have previously provided monitoring services, and third-party distributed monitoring entities expected to provide monitoring services.

In some embodiments of this invention, distributed publishing entity 504 or another distributed publishing entity may provide information including information about which third-party distributed monitoring entities have in the past monitored distributed monitored entity 500 and other distributed monitored entities, and/or about which third-party monitoring entities are likely in the future to so monitor, because distributed consumer entities like distributed consumer entity 506 may wish to use this information in determining which of several possible third-party distributed monitoring entities to make use of (on, for instance, the theory that a third-party distributed monitoring entity that has been used for this purpose in the past may be expected to be able to do it at present, or that an entity that has indicated that it is likely to do so in the future may be more prepared to do so now). Later, when distributed consumer entity 506 desires to locate an entity to provide a particular service, this entity sends query message 514 to distributed publishing entity 504. In response to receiving query message 514, distributed publishing entity 504 identifies entities that can provide services specified in query message 514. Information about these entities is returned to distributed consumer entity 506 in reply message 516. This reply contains information about entities, such as distributed monitored entity 500. Further, the information returned in reply message 516 to distributed consumer entity 506 also includes, in this example, information about automatically monitoring distributed monitored entity 500 for proper operation. In response to receiving reply message, distributed consumer entity 506 may select one or more entities with which to operate and communicate. In this example, the entity is distributed monitored entity 500.

In addition, distributed consumer entity 506 sends query message 518 to distributed publishing entity 504 in which query message 518 requests information about third-party distributed monitoring entities capable of performing monitoring operations described in reply message 516. In response to receiving query message 518, distributed publishing entity 504, identifies one or more third-party distributed monitoring entities that can perform monitoring operations on distributed monitored entity 500. As described above, these monitoring operations may take various forms, such as tests or methods that may be executed on an entity to determine whether the entity is properly operating. This information is returned to distributed consumer entity 506 in reply message 520. Based on this information, distributed consumer entity 506 selects one or more third-party distributed monitoring entities for use in monitoring distributed monitored entity 500.

Thereafter, distributed consumer entity 506 contacts distributed monitored entity 500 and initiates functional operations 522 to avail itself of services offered by distributed monitored entity 500. Distributed consumer entity 506 also contacts third-party distributed monitoring entity 502 using request 524 to request monitoring of distributed monitored entity 500. The monitoring requested is for operations as described in reply message 516 received from distributed publishing entity 504. For example, the operations may specify a monitoring method that is to be applied to distributed monitored entity 500. Alternatively, if the monitoring method is not specified in request 524, the information in this request may include information as to how a monitoring method may be identified. In this instance, third-party distributed monitoring entity 502 may identify a monitoring method for use in monitoring distributed monitored entity 500 by examining published information, such as that provided in directory 510 within distributed publishing entity 504. This request also may include any certificates, verification information, or delegation instruments required for third-party distributed monitoring entity 502 to carry out monitoring operations on distributed monitored entity 500 on behalf of distributed consumer entity 506. As a result, third-party distributed monitoring entity 502 carries out monitoring operations 526 on distributed monitored entity 500. Depending on the results, third-party distributed monitoring entity 502 takes actions, which may include sending notification 528 to distributed consumer entity 506 if one or more tests performed in the monitoring operations suggest the existence of a problem or failure in distributed monitored entity 500. The failure of particular interest is a failure of the service desired by distributed consumer entity 506. Other services provided by distributed monitored entity 500 may not be tested or failures in those services do not trigger notification 528. Depending on the particular implementation, services provided by third-party distributed monitoring entity 502 may be provided with a fee being charged to distributed consumer entity 506 for the monitoring service.

In another embodiment of the present invention, third-party distributed monitoring entity 502 contacts distributed publishing entity 504 to obtain information about testing operations to be performed on distributed monitored entity 500. In still other embodiments, third-party distributed monitoring entity 502 contacts distributed monitored entity 500 itself for that information. In still other embodiments, third-party distributed monitoring entity 502 may infer an appropriate method for monitoring distributed monitored entity 500 by examining other information about that entity, derived from distributed publishing entity 504 or from other sources.

In yet other embodiments of the present invention, third-party distributed monitoring entity 502 publishes or otherwise makes available information concerning which distributed monitored entities that third-party distributed monitoring entity 502 is already monitoring. With publication of this type of information distributed consumer entities, such as distributed consumer entity 506 may elect to request monitoring services of a third-party distributed monitoring entity that is already engaged in monitoring of a given distributed monitored entity, such as distributed monitored entity 500 to receive a discount on the price charged or for the sake of efficiency.

Figure 6:
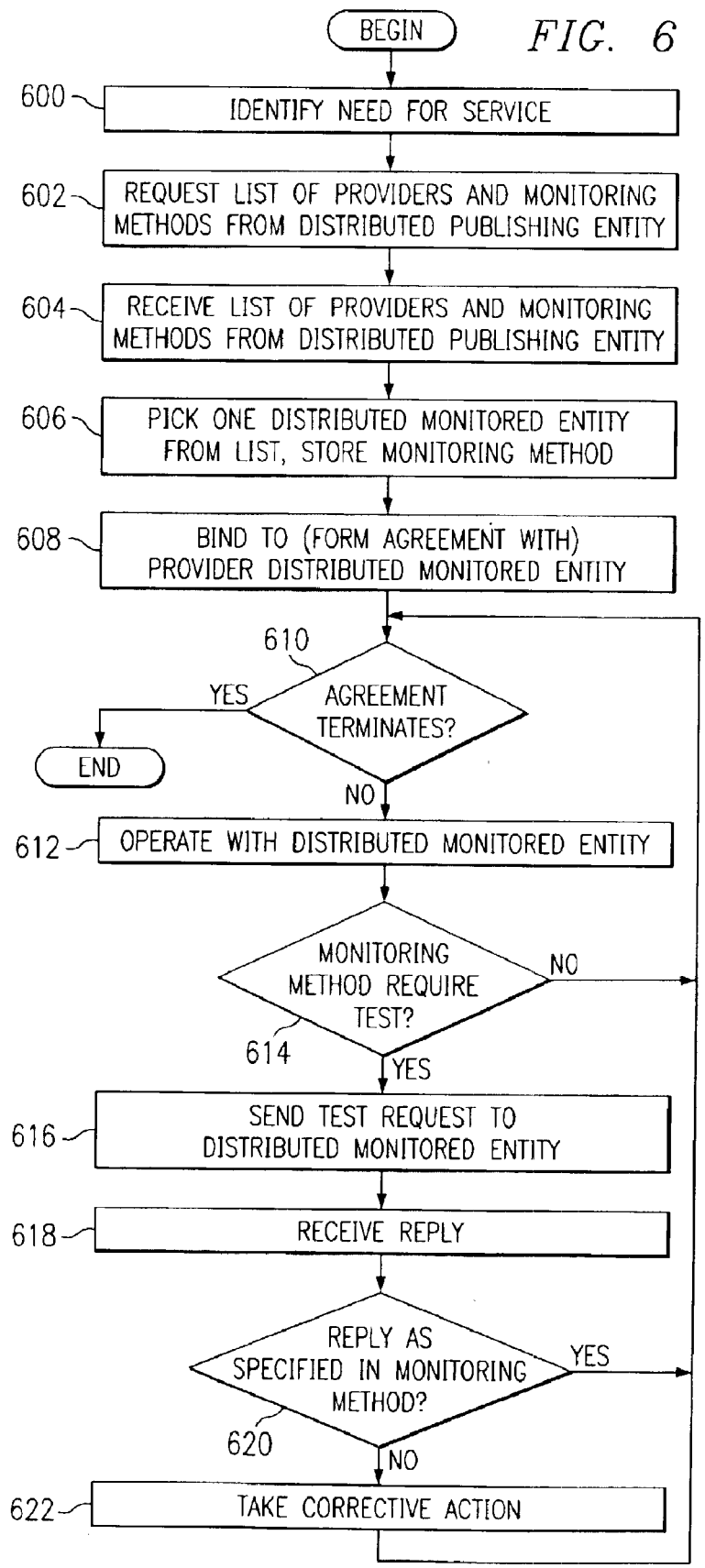
FIG. 6 is a flowchart of a process used for identifying and monitoring an entity in accordance with a preferred embodiment of the present invention.

Turning now to FIG. 6, a flowchart of a process used for identifying and monitoring an entity is depicted in accordance with a preferred embodiment of the present invention. The process illustrated in FIG. 6 may be implemented in a client, such as distributed consumer entity 404 in FIG. 4.

The process begins by identifying a need for a service (block 600). A list of providers and monitoring methods is requested from a distributed publishing entity, such as distributed publishing entity 404 in FIG. 4 (block 602). A list of providers and monitoring methods is received from the distributed publishing entity (block 604). One distributed monitoring entity provider is picked from the list and the monitoring method is stored (block 606). Depending on the particular implementation, more than one entity may be selected. An agreement is formed with the selected distributed monitored entity to provide services to the selected distributed consumer entity (block 608). This agreement may be formed using various automated negotiation protocols or methods currently employed. A determination is made as to whether the agreement terminates (block 610). This agreement may terminate under various conditions specified in the agreement. For example, the agreement may terminate after a set amount of time, after a set amount of time without the agreement being renewed, after some number of transactions, at the initiation of either party, or based on some market condition being present, such as the price of a good or service being above or below some selected value. Another trigger for termination of the agreement may be the failure of a test announced using the present invention. With this type of failure, the process would return to the beginning of FIG. 6 at block 600. If the agreement does not terminate, the client operates with the distributed monitored entity (block 612). These operations may vary depending on the services being provided by the distributed monitored entity to the distributed consumer entity. The operations may include, for example, language translation, stock market quotes, news updates, mathematical calculations, storage and retrieval of binary data, database searches, provision of content such as streaming audio or video, and weather prediction.

Next, a determination is made as to whether the monitoring method requires a test of the distributed monitored entity (block 614). If the monitoring method does require a test, the test request is sent to the distributed monitored entity (block 616), and a reply is received from the distributed monitored entity (block 618). A determination is made as to whether to reply as specified in the monitoring method (block 620). Basically, block 620 is used to determine whether the distributed monitored entity is performing as expected or an error or failure has occurred. If the reply is not as specified in the monitoring method, corrective action is taken (block 622) and the process returns to block 610 as described above. In some cases, depending on the failure and the success of the corrective action, the process may be unable to return to block 610. Such a case may occur if the distributed monitored entity has suffered a serious failure and corrective action has failed to fix the failure. In this case, the distributed monitored entity may be unable to operate normally.

The corrective action performed in block 622 may take various forms, including, for example, restarting the distributed monitored entity, sending a notification to a human operator, selecting another distributed monitored entity, terminating execution of the distributed monitored entity, or generating an entry in a log file. A restive or corrective action taken may be a particular message being sent based on the results of testing matching selected criteria. For example, if no response is received from application of the monitoring method, the message may indicate that the entity is unavailable. If an error is returned in response to the testing, the message may indicate that the entity is functioning improperly. These messages may be sent to various entities, including, for example, the distributed consumer entity requesting the monitoring and the distributed publishing entity at which the distributed monitored entity is registered. Further, the corrective action also may include executing a program or process in response to testing matching selected criteria. For example, the corrective action might consist of starting a standard problem-determination program or process, giving it parameters containing sufficient information to identify the entity that failed the test, and the nature of the test that was failed. One way the distributed consumer entity would know what corrective measures to try would be by consulting its own internal policies about what to do in such a case. Another way the distributed consumer entity would know what corrective measures to try would be by finding that information bundled along with the test-method information that it received from the distributed publishing entity. Another corrective action may include taking an action with respect to the distributed monitored entity that is likely to break an internal deadlock within that entity when the results of testing match selected criteria. With respect to breaking an internal deadlock, a request may be sent to the platform on which the distributed monitored entity is running. This request may be one asking the platform to terminate any thread of the distributed monitored entity that has been waiting for a lock for some selected period of time. Criteria initiating this corrective action may be based on any policy desired for the particular implementation.

With reference again to block 620, if the reply is as specified in the monitoring method, the process returns to block 610 as described above. Turning again to block 614, if the monitoring method does not require a test, the process returns to block 610 as described above. With reference again to block 610, if the agreement terminates, the process terminates.

Figure 7:
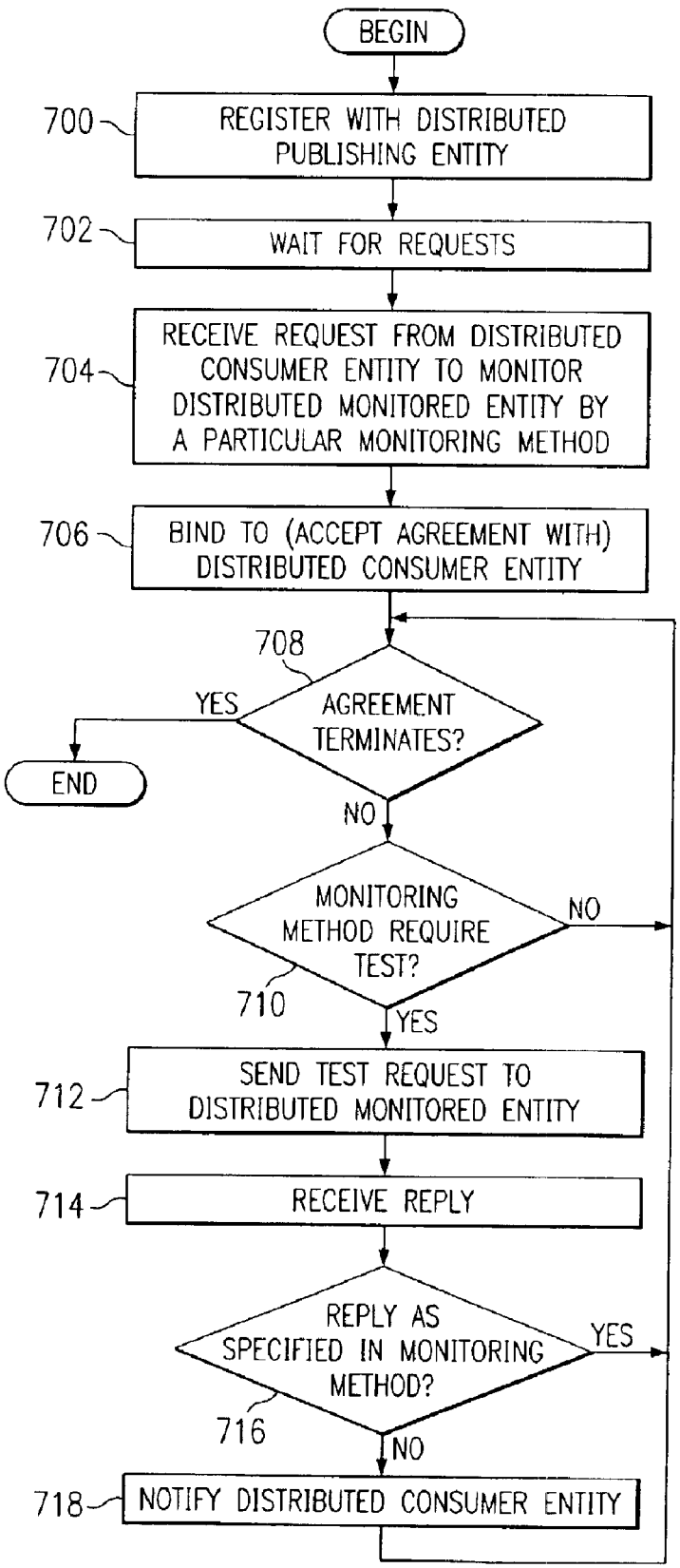
FIG. 7 is a flowchart of a process used by a third-party distributed monitoring entity to monitor an entity in accordance with a preferred embodiment of the present invention.

With reference now to FIG. 7, a flowchart of a process used by a third-party distributed monitoring entity to monitor an entity is depicted in accordance with a preferred embodiment of the present invention. The process illustrated in FIG. 7 may be implemented in a third-party distributed monitoring entity, such as third-party distributed monitoring entity 502 in FIG. 5.

The process begins by registering with a distributed publishing entity (block 700). In block 700, the third-party distributed monitoring entity sends information about monitoring operations that this entity may perform. The information also may identify particular entities that may be monitored. Thereafter, the process waits for requests (block 702). In block 702, the requests waited for are those from an entity, such as those from a distributed consumer entity desiring monitoring of an entity providing a service. A request is received from the distributed consumer entity to monitor the distributed monitored entity by a particular monitoring method (block 704). An agreement is formed with the distributed consumer entity (block 706). This agreement may be reached through any presently known or used negotiation protocol. For instance, the distributed consumer entity may propose one of a set of standard monitoring agreements to the third-party distributed monitoring entity, and the latter may accept the proposal. Alternatively, the monitoring agreement may be formed by any of various automated negotiation protocols or other methods known to the art. In any case, as part of the agreement, the distributed consumer entity will provide the third-party distributed monitoring entity with information sufficient to allow it to perform the requested monitoring of the distributed monitored entity.

Thereafter, a determination is made as to whether the agreement terminates (block 708). Various factors, as discussed above, may cause the agreement to terminate. The most common factor is typically time. If the agreement does not terminate, a determination is made as to whether the monitoring method identified for the distributed monitored entity requires a test (block 710). If the monitoring method does require a test, the test request is sent to the distributed monitored entity and a reply is received (block 712).

Next, a determination is made as to whether the results in the reply are as specified in the monitoring method (block 716). If the results in the reply are not as specified in the monitoring method, a notification is sent to the distributed consumer entity (block 718) and the process returns to block 708 as described above. With reference again to block 716, if the results in the reply are as specified in the test method, the process returns to block 708 as described above. Turning again to block 710, if the monitoring method does not require a test yet, the process returns to block 708 as described above. With reference again to block 708, if the agreement terminates, the process terminates.

With reference now to FIG. 8, a diagram illustrating a data structure used in publishing monitoring methods for an entity is depicted in accordance with a preferred embodiment of the present invention. Data structure 800 is an example of a data structure that may be used to provide information to an entity, such as, for example, a distributed consumer entity or a third-party distributed monitoring entity. Section 802 contains lines of description describing an operation that may be performed on a language-translation service to determine whether or not it is correctly performing its basic functions, and the reply that will be received from that operation if the element is correctly performing its basic function. Section 804 contains lines of description describing the fact that a Web service port of a particular service port type may be tested using the operation and expected reply described in section 802.

Prior art methods send data structures such as data structure 800 without sections 802 and 804 as part of normal WSDL fragments. The present invention adds information such as illustrative sections 802 and 804 to provide for the monitoring mechanisms described above. Section 804 includes an assertion that the port type may be tested using a particular operation and expecting a particular message to be returned in response to the operation. Section 802 defines the operation and the response. The lines in sections 802 and 804 are provided as extensions to WSDL with the other portions being standard WSDL coding. The example illustrated in FIG. 8 uses extensible markup language (XML). This example is provided as an illustration, but is not intended to limit the invention to using this particular format. Any other format may be used depending on the particular implementation.

Thus, the present invention provides an improved method, apparatus, and computer instructions for publishing and providing information to identify and monitor entities in an autonomic computing system. The mechanism uses standardized languages, such as WSDL or UDDI, to provide or publish information about monitoring methods that may be used for particular entities that have been registered with the mechanism of the present invention. In this manner, a client, such as a distributed consumer entity, may request and receive an identification of entities that are able to provide a desired service. In addition to an identification of the service, the mechanism of the present invention provides information indicating how the entity providing the service may be monitored to verify that the entity is able to provide the service as required by the client. With this information, the client is able to monitor the service and take corrective action if monitoring indicates that the entity is unable to function in the manner required.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include record able-type media, such as a floppy disk, a hard disk drive, a RAM, CD-ROM's, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system for monitoring entities comprising:
   a plurality of announcements, wherein a number of announcements within the plurality of announcements contain a description of a monitoring method for use in monitoring behavior of a distributed monitored entity, wherein the description is in a computer readable format; and
   a distributed publishing entity, wherein the distributed publishing entity publishes the plurality of announcements to clients, wherein at least one of the number of announcements is adapted to be used by a client to perform at least one of determining the monitoring method for use by a distributed monitored entity to monitor its own behavior, determining the monitoring method that a distributed consumer entity uses to monitor the distributed monitored entity, and determining the monitoring method that a third-party distributed monitoring entity uses to monitor the distributed monitored entity.

2. The data processing system of claim 1, wherein the client is one of the distributed monitored entity, the distributed consumer entity, and the third-party distributed monitoring entity.

3. The data processing system of claim 1, wherein the monitoring method is provided in the number of announcements in response to agreements existing between the distributed monitored entity and the client.

4. The data processing system of claim 1, wherein the distributed publishing entity also provides information of the distributed monitored entity through the plurality of announcements and allows a search through a directory for entities matching selected criteria.

5. The data processing system of claim 1, wherein the client executes the monitoring method and performs an action in response to a result of executing the monitoring method.

6. The data processing system of claim 5, wherein the resultant action includes at least one of sending a message to a particular distributed entity when the result matches certain criteria, executing a particular algorithm identified in an announcement when the result matches the certain criteria, restarting the distributed monitored entity when the result matches the certain criteria, creating a new distributed monitored entity when the result matches the certain criteria, terminating the distributed monitored entity when the result matches the certain criteria, initiating a problem-determination process, and breaking an internal deadlock within the distributed monitored entity.

7. The data processing system of claim 1, wherein the monitoring system includes the third-party distributed monitoring entity and wherein the third-party distributed monitoring entity accepts requests to monitor the distributed monitored entity.

8. The data processing system of claim 7, wherein the request is received from the distributed consumer entity.

9. The data processing system of claim 7, wherein a fee is charged by the third-party distributed monitoring entity to monitor the distributed monitored entity.

10. The data processing system of claim 7, wherein the request includes at least one of an identification of the monitoring method, an identification of how to select a particular monitoring method to fulfill the request, a certificate, and an authorization.

11. The data processing system of claim 7, wherein the third-party distributed monitoring entity identifies the monitoring method by examining announcements containing information about the distributed monitored entity within the plurality of announcements.

12. The data processing system of claim 1, wherein the plurality of announcements includes statistical information about the distributed monitored entities.

13. The data processing system of claim 12, wherein the statistical information includes an identification of distributed monitoring entities currently monitoring distributed monitored entities, distributed monitoring entities previously monitoring distributed monitored entities, and distributed monitoring entities expected to monitor distributed monitored entities.

14. The data processing system of claim 13, wherein the statistical information is provided in response to the request.

15. The data processing system of claim 13, wherein the client may request a change in parameters used in the monitoring method executed by a selected distributed monitoring entity engaged in monitoring a distributed monitored entity.

16. The data processing system of claim 15, wherein a result of monitoring the distributed monitored entity is sent to a set of entities.

17. The data processing system of claim 1, wherein the distributed monitored entity supports a monitoring interface designed to enable initiation of the testing method on the distributed monitored entity.

18. The data processing system of claim 17, wherein the monitoring interface accepts a request and generates a response including at least one of an indication that the distributed monitored entity is able to respond to requests, an indication that a particular function is operating correctly, an indication that a set of functions are operating correctly, a continuous data stream, and a periodic data stream.

19. The data processing system of claim 1, wherein the monitoring method includes sending an invalid request to the distributed monitored entity and verifying that an expected error message is received in response.

20. The data processing system of claim 1, wherein the monitoring method includes requesting a data stream from the distributed monitored entity and verifying that the data stream continues to arrive as expected.

21. A method in a data processing system for providing monitoring of a set of entities, the method comprising:
registering the set of entities, wherein information registered includes identifying a monitoring method and a service provided for each entity in the set of entities; and
selectively announcing the information for the set of entities to clients requiring a particular service, wherein the selectively announcing comprises:
responsive to receiving a request from the client for the particular service, identifying an entity from the set of entities;
sending a reply to the client, wherein the reply includes information identifying the entity and a monitoring method for the entity, wherein the information is in a computer readable format, and wherein the information allows the client to monitor the entity;
responsive to receiving a request from the client for a third party monitoring entity, identifying a particular third party monitoring entity capable of monitoring the entity; and
sending another reply to the client, wherein the another reply includes information identifying the particular third party monitoring entity capable of monitoring the entity,
wherein clients use the information to monitor for a selected entity within the set of entities providing the particular service.

22. The method of claim 21, wherein the request includes an identification of the monitoring method.

23. A network data processing system comprising:
a network;
a distributed monitored entity connected to the network;
a distributed consumer entity connected to the network;
a distributed publishing entity connected to the network, wherein the distributed monitored entity has a particular service that is registered with the distributed publishing entity, the distributed publishing entity provides the distributed consumer entity with information identifying the distributed monitored entity and identifying how the distributed monitored entity is automatically monitored, and the distributed consumer entity monitors the distributed monitored entity using the information, wherein a distributed monitoring entity executes a monitoring method on the distributed monitored entity using the information identified by the distributed publishing entity, and wherein the distributed monitoring entity, responsive to receiving a result matching a criteria, performs corrective actions including at least one of sending a notification to an administrator, sending a notification to another entity, logging the result, restarting the entity, selecting a new entity to provide the service, and initiating termination of the entity.

24. A network data processing system comprising:
a network;
a distributed monitored entity connected to the network;
a distributed consumer entity connected to the network;
a distributed publishing entity connected to the network, wherein the distributed monitored entity has a particular service that is registered with the distributed publishing entity, the distributed publishing entity provides the distributed consumer entity with information identifying the distributed monitored entity and identifying how the distributed monitored entity is automatically monitored, and the distributed consumer entity monitors the distributed monitored entity using the information, wherein a distributed monitoring entity provides automatic monitoring of the distributed monitored entity for the distributed consumer entity in response to a request from the distributed consumer entity.

25. A data processing system for providing monitoring of a set of entities, the data processing system comprising:
registering means for registering the set of entities, wherein information registered includes identifying a monitoring method and a service provided for each entity in the set of entities; and
announcing means for selectively announcing the information for the set of entities to clients requiring a particular service, wherein clients use the information to monitor for a selected entity within the set of entities providing the particular service, wherein the selectively announcing means comprises:
first identifying means, responsive to receiving a request from the client for the particular service, for identifying an entity from the set of entities;
first sending means for sending a reply to the client, wherein the reply includes information identifying the entity and a monitoring method for the entity, wherein the information is in a computer readable format, and wherein the information allows the client to monitor the entity;
second identifying means, responsive to receiving a request from the client for a third party monitoring entity, for identifying a particular third party monitoring entity capable of monitoring the entity; and
second sending moans for sending another reply to the client, wherein the another reply includes information identifying the particular third party monitoring entity capable of monitoring the entity.

26. The data processing system of claim 25, wherein the request includes an identification of the monitoring method.

27. A computer program product in a computer readable medium for monitoring entities, the computer program product comprising:
first instructions for identifying a plurality of announcements, wherein a number of announcements within the plurality of announcements contain a description of a monitoring method for use in monitoring behavior of a distributed monitored entity, wherein the description is in a computer readable format; and second instructions for publishing the plurality of announcements to clients, wherein a client uses at least one of the number of announcements to perform at least one of determining the monitoring method for use by a distributed monitored entity to monitor its own behavior, determining the monitoring method that a distributed consumer entity uses to monitor the distributed monitored entity, and determining the monitoring method that a third-party distributed monitoring entity uses to monitor the distributed monitored entity.

* * * * *